United States Patent
Liang et al.

(10) Patent No.: US 9,787,133 B2
(45) Date of Patent: Oct. 10, 2017

(54) HOT-PLUGGABLE UNINTERRUPTIBLE POWER SUPPLY MODULE

(71) Applicant: Compuware Technology Inc., New Taipei (TW)

(72) Inventors: Chien-Ta Liang, New Taipei (TW); Wei-Cheng Huang, New Taipei (TW)

(73) Assignee: COMPUWARE TECHNOLOGY INC., New Taipei (TW)

( * ) Notice: Subject to any disclaimer, the term of this patent is extended or adjusted under 35 U.S.C. 154(b) by 496 days.

(21) Appl. No.: 14/512,461

(22) Filed: Oct. 12, 2014

(65) Prior Publication Data

US 2015/0076915 A1    Mar. 19, 2015

Related U.S. Application Data

(63) Continuation-in-part of application No. 13/353,332, filed on Jan. 19, 2012, now abandoned.

(51) Int. Cl.
*H02J 1/00* (2006.01)
*H02J 9/06* (2006.01)
*H02M 7/08* (2006.01)
*H02J 7/04* (2006.01)

(52) U.S. Cl.
CPC ............ *H02J 9/061* (2013.01); *H02J 7/044* (2013.01); *H02J 9/062* (2013.01); *H02M 7/08* (2013.01); *H02J 2009/068* (2013.01); *Y10T 307/625* (2015.04)

(58) Field of Classification Search
CPC .. H02J 9/061; H02J 7/044; H02J 9/062; H02J 2009/068; H02M 7/08; Y10T 307/625
See application file for complete search history.

(56) References Cited

U.S. PATENT DOCUMENTS 6,121,695 A * 9/2000 Loh .................... G06F 1/26
                                              307/64
2014/0082393 A1 * 3/2014 Liang .................. H02J 9/062
                                              713/323

* cited by examiner

*Primary Examiner* — Daniel Cavallari
(74) *Attorney, Agent, or Firm* — Leong C. Lei (57) ABSTRACT

A hot-pluggable uninterruptible power supply module includes at least one first power supply device, each first power supply device having an end electrically connected with an electronic system and another end electrically connected with an external AC power source; at least one hot-swapping uninterruptible power supply module, each hot-swapping uninterruptible power supply module including a control module, a second power supply device, and a battery that is electrically connected with the second power supply device. The second power supply device is electrically connected with the control module. The control module of each hot-swapping uninterruptible power supply module is electrically connected with each first power supply device. The second power supply device of each hot-swapping uninterruptible power supply module is electrically connected with the electronic system and an end of each first power supply device.

8 Claims, 10 Drawing Sheets

HOT-PLUGGABLE UNINTERRUPTIBLE POWER SUPPLY MODULE

CROSS-REFERENCE TO RELATED APPLICATIONS

This application is a continuation-in-part of U.S. patent application Ser. No. 13/353,332, filed Jan. 19, 2012.

BACKGROUND OF THE INVENTION (a) Technical Field of the Invention

The present invention generally relates to a hot-pluggable uninterruptible power supply module, and more particularly to a hot-pluggable uninterruptible power supply module comprising therein a control module and a second power supply device for achieving the purpose that the hot-pluggable uninterruptible power supply module supports redundancy and maintains a system in a power uninterrupted condition in hot swapping connection with a first power supply device of an external alternate-current (AC) power source.

(b) Description of the Prior Art

A conventional computer server receives power from an external AC power source. When the AC power source is interrupted or is of sufficiency is supplying electrical power due to certain factors and reasons, the operation of the computer server is likely affected and events of unexpected system shutdown or service interruption may consequently result. A possible solution for avoiding power supply interruption is using an externally connected uninterruptible power supply (UPS). However, using USP has disadvantages, including an additional external space required for installation of the UPS, the computer server being shut down during the installation or maintenance, and reduction of energy efficiency due to the consumption of electrical power by the UPS and voltage conversion.

Thus, the technical issue that the present invention aims to overcome is to eliminate the above-discussed problems.

SUMMARY OF THE INVENTION

In view of the above-discussed drawbacks, an object of the present invention is to provide a hot-pluggable uninterruptible power supply module, which comprises therein a control module and a second power supply device for achieving the purpose that the hot-pluggable uninterruptible power supply supports redundancy and maintains a system in a power uninterrupted condition in hot swapping connection with a first power supply device of an external alternate-current (AC) power source.

To achieve the above object, the present invention provides a hot-pluggable uninterruptible power supply module, which comprises:

at least one first power supply device, wherein each of the first power supply devices has an end electrically connected with an electronic system and each of the first power supply devices has another end electrically connected with an external AC power source, whereby each of the first power supply devices converts an alternate-current voltage into a direct-current voltage to achieve a function of supplying electrical power to the electronic system; and at least one hot-swapping uninterruptible power supply module, wherein each of the hot-swapping uninterruptible power supply modules comprises a control module, a second power supply device, and a battery, the battery being electrically connected with the second power supply device, the second power supply device being electrically connected with the control module, the control module of each of the hot-swapping uninterruptible power supply modules being electrically connected with each of the first power supply device, the second power supply device of each of the hot-swapping uninterruptible power supply module being electrically connected with the electronic system and an end of each of the first power supply device.

The present invention provides a hot-pluggable uninterruptible power supply module, in which the hot-pluggable uninterruptible power supply module is arranged to comprise a control module and a second power supply device for achieving the purpose that the hot-pluggable uninterruptible power supply module supports redundancy and maintains a system in a power uninterrupted condition in hot swapping connection with a first power supply device of an external AC power source.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
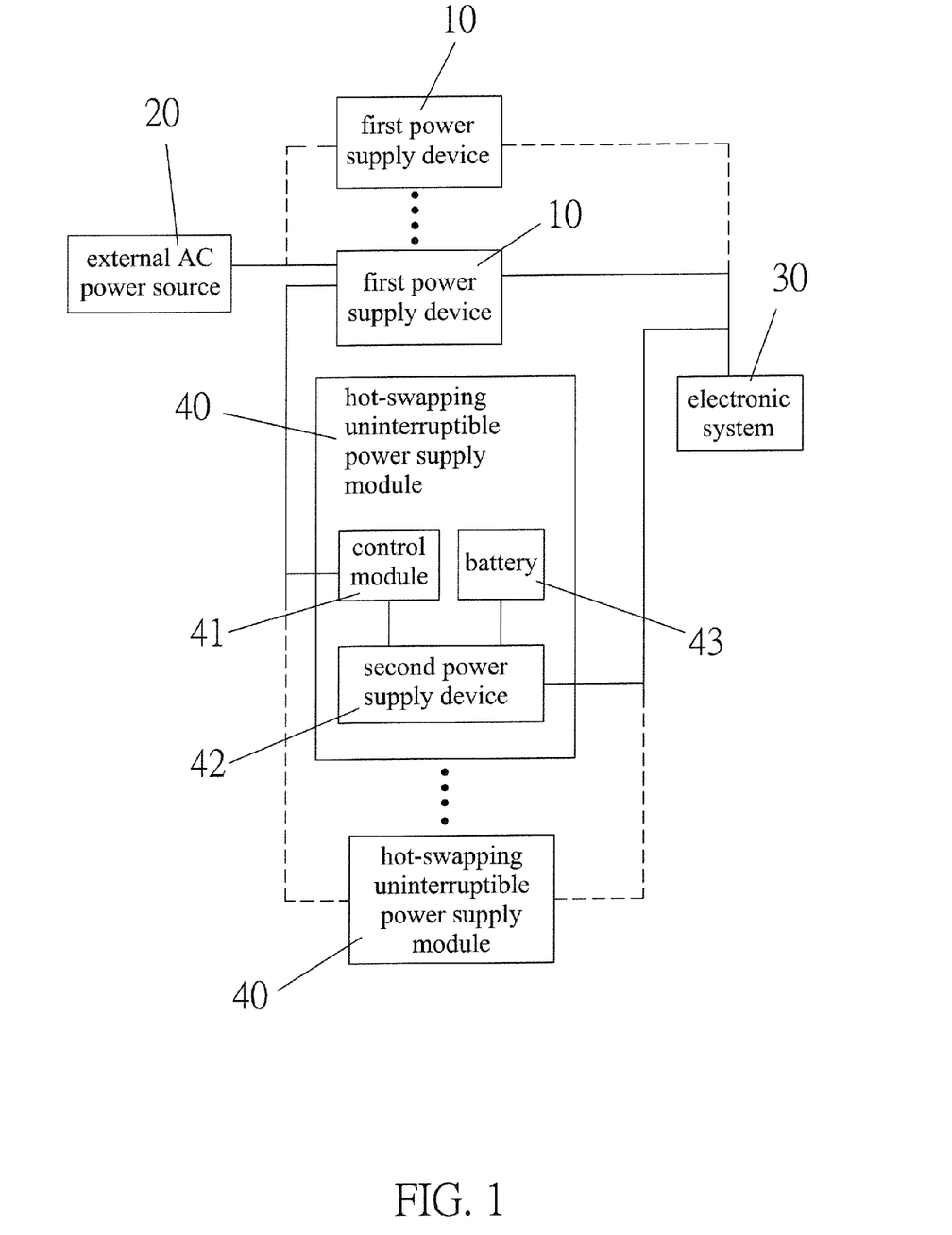
FIG. 1 is a block diagram of the present invention.
Figure 10:
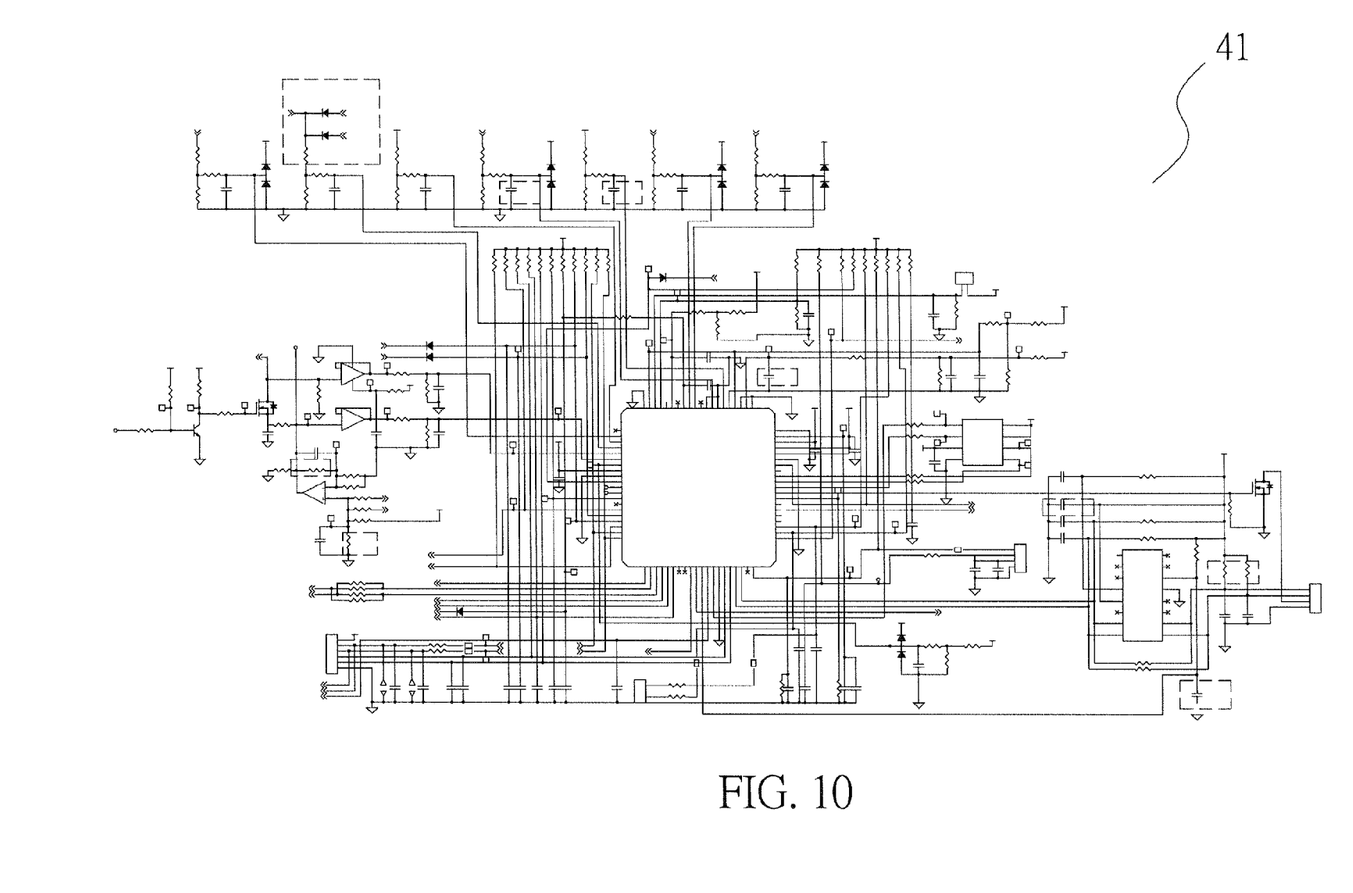
FIG. 10 is a circuit diagram of a control module of the present invention.

Referring to FIG. 1, the present invention provides a hot-pluggable uninterruptible power supply module, which comprises:

at least one first power supply device 10, wherein each of the first power supply devices 10 has an end electrically connected with an electronic system 30 and each of the first power supply devices 10 has another end electrically connected with an external AC power source 20, each of the first power supply devices 10 being electrically connected with each other in parallel, each of the first power supply devices 10 converting an alternate-current (AC) voltage into a direct-current (DC) voltage in order to achieve a function of supplying electrical power to the electronic system 30; and at least one hot-swapping uninterruptible power supply module 40, wherein each of the hot-swapping uninterruptible power supply modules 40 comprises therein a control module 41, a second power supply device 42, and a battery 43, the battery 43 being electrically connected with the second power supply device 42, the second power supply device 42 being electrically connected with the control module 41, the control module 41 of each of the hot-swapping uninterruptible power supply modules 40 being electrically connected with each of the first power supply devices 10, the second power supply device 42 of each of the hot-swapping uninterruptible power supply modules 40 being electrically connected with the electronic system 30 and an end of each of the first power supply devices 10, each of the hot-swapping uninterruptible power supply modules 40 being electrically connected with each other in parallel, the battery 43 being a rechargeable battery, such as a lithium battery, the control module 41 comprising an electronic circuit so as to achieve a function of controlling charging and discharging of the second power supply device 42 and the battery 43 as shown in FIG. 10.

Figure 5:
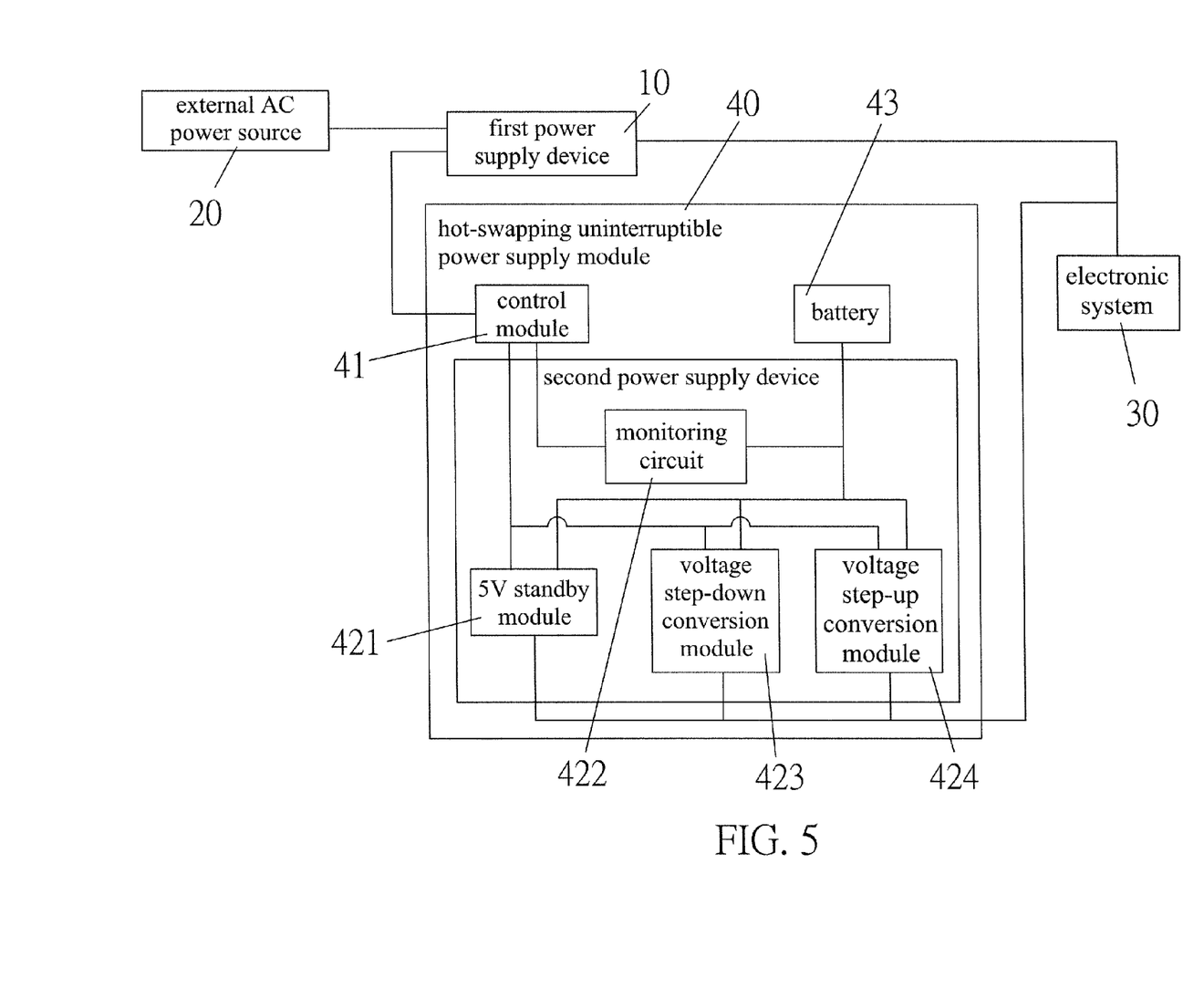
FIG. 5 is a block diagram of a second power supply device according to the present invention.
Figure 6:
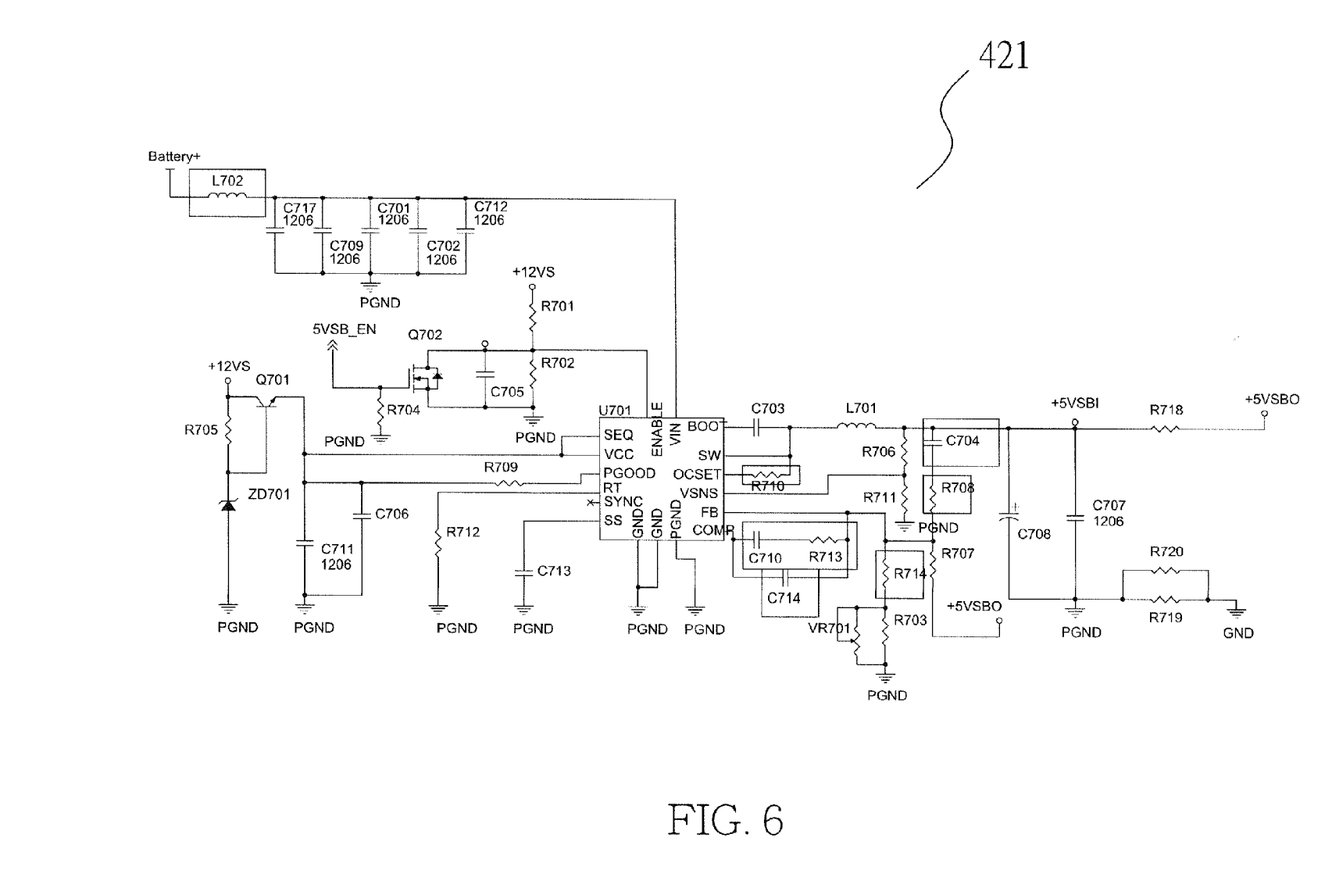
FIG. 6 is a circuit diagram showing a 5V standby module according to the present invention.
Figure 7:
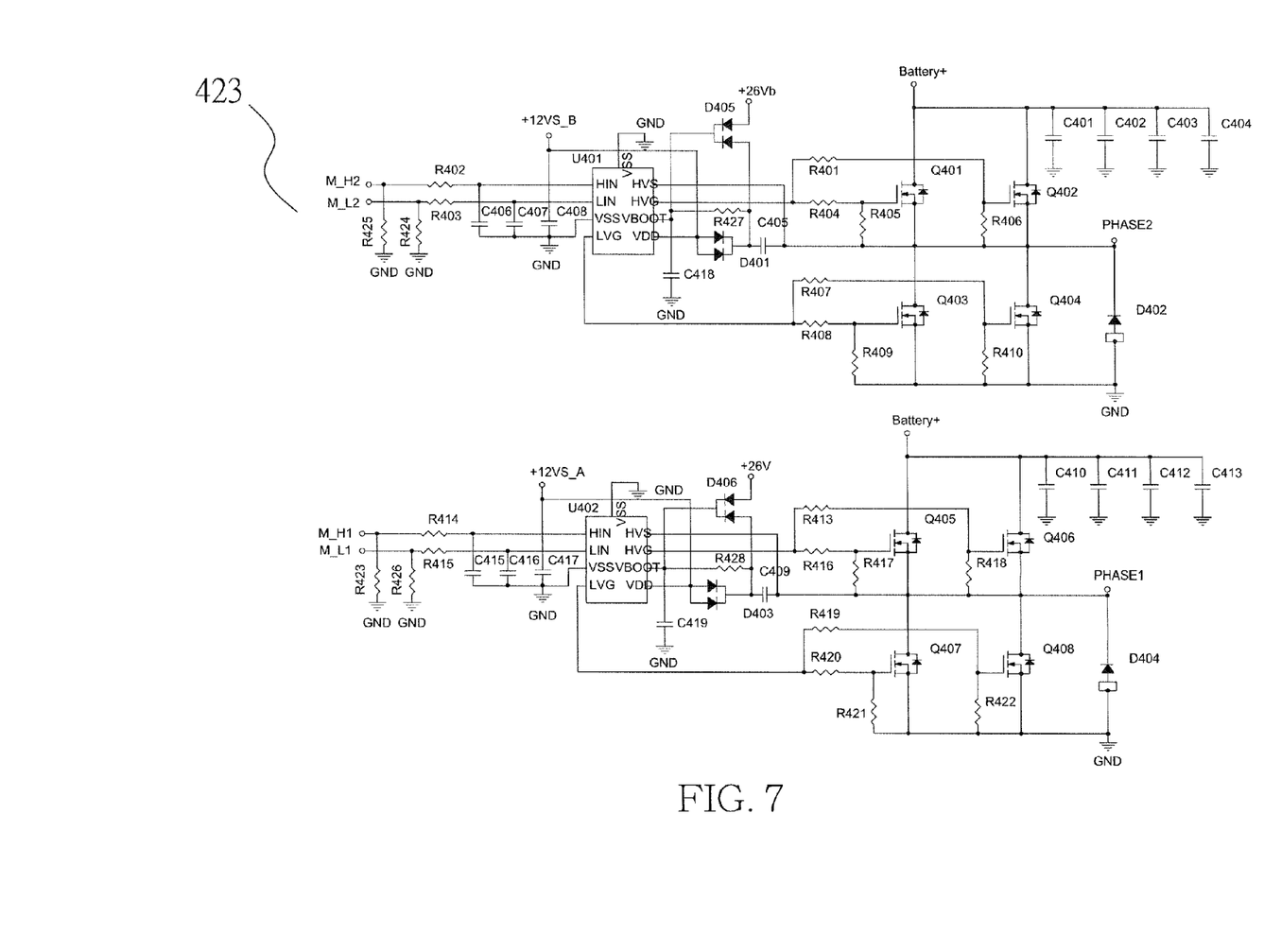
FIG. 7 is a circuit diagram showing a voltage step-down conversion module according to the present invention.
Figure 8:
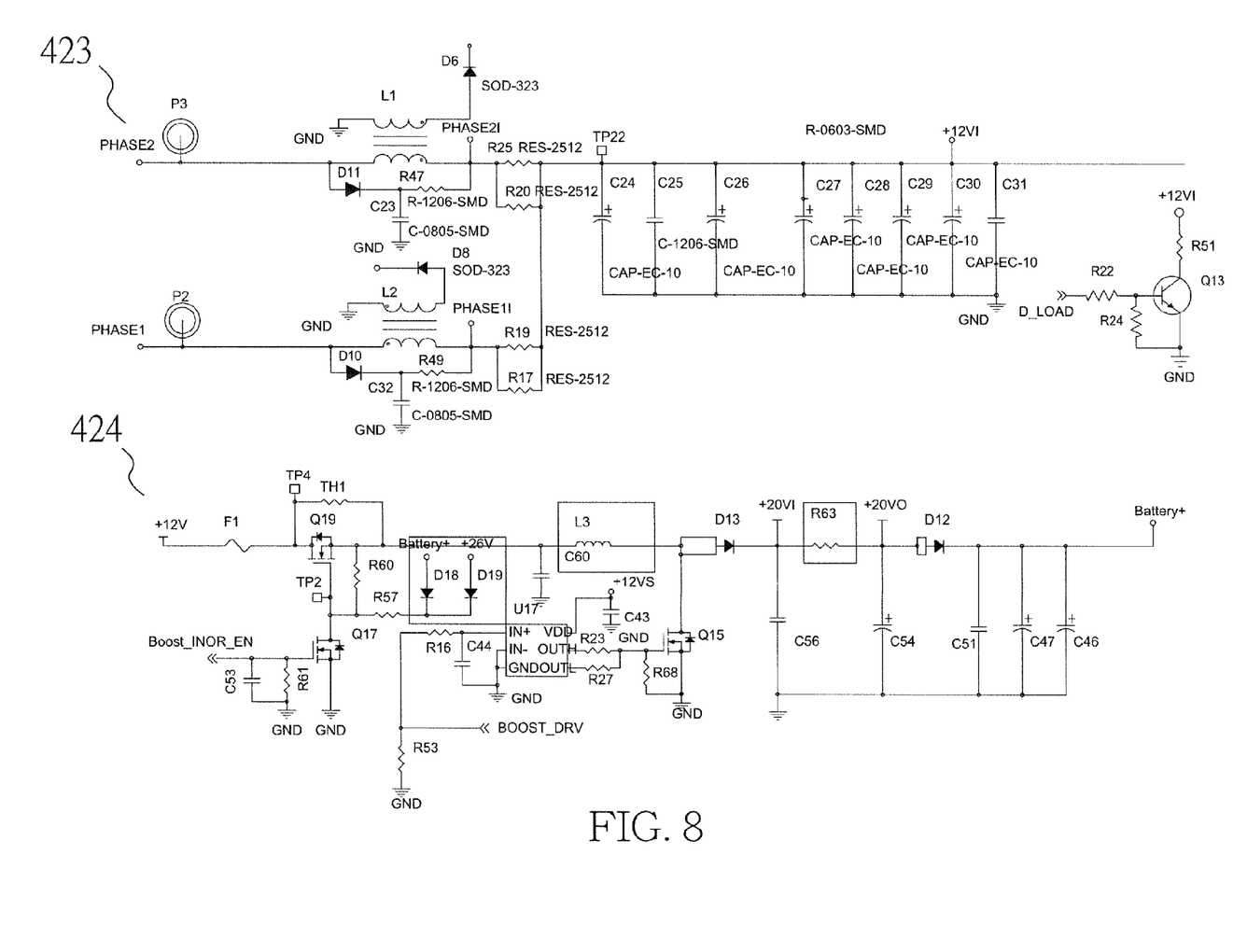
FIG. 8 is a circuit diagram showing a voltage step-down conversion module and a voltage step-up conversion module according to the present invention.
Figure 9:
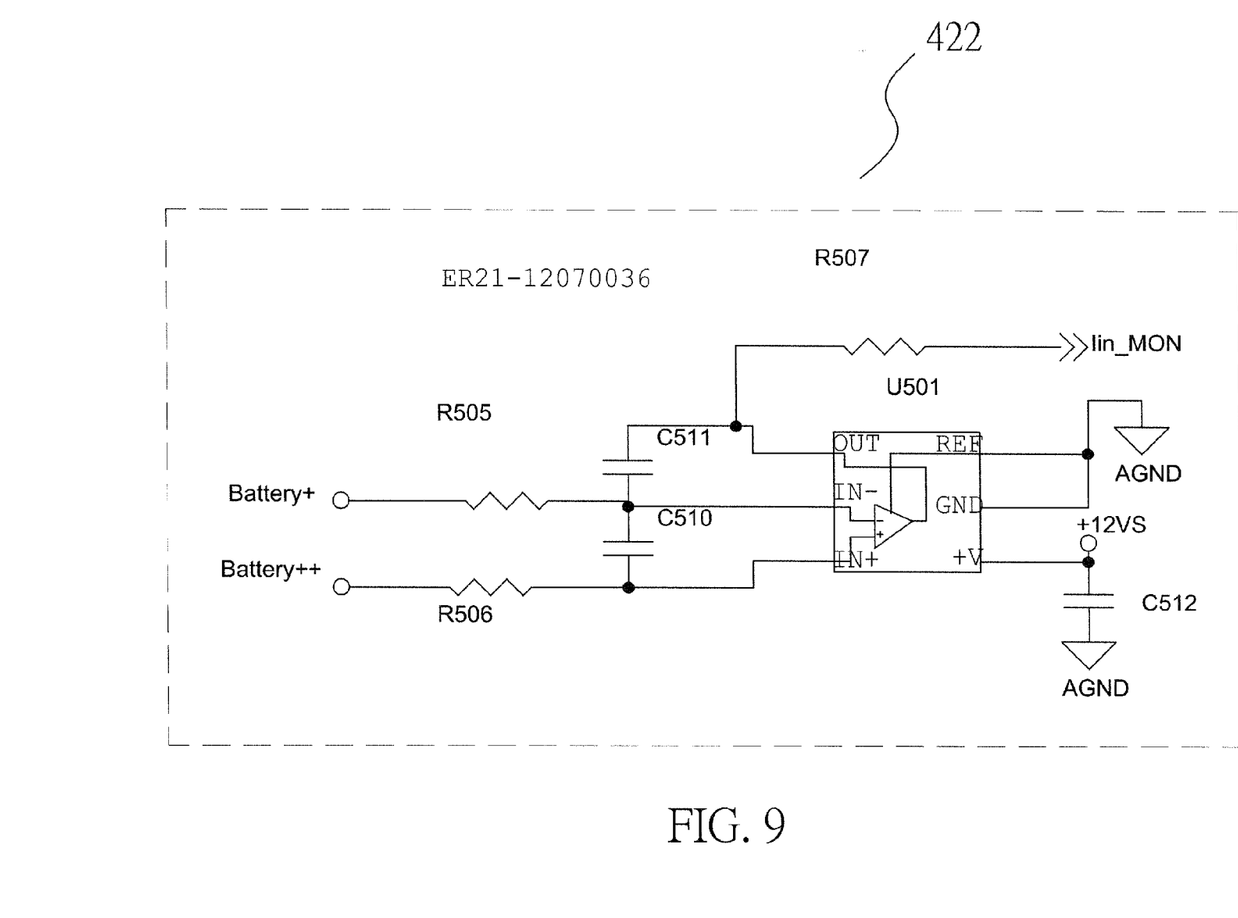
FIG. 9 is a circuit diagram of a monitoring circuit of the present invention.

Referring to FIG. 5, the second power supply device 42 according to the present invention further comprises therein a 5V standby module 421, a monitoring circuit 422, a voltage step-down conversion module 423, and a voltage step-up conversion module 424. The voltage step-up conversion module 424 is electrically connected with the battery 43 of the hot-swapping uninterruptible power supply module 40. The voltage step-down circuit 423 is electrically connected with the battery 43 of the hot-swapping uninterruptible power supply module 40. The monitoring circuit 422 has an end electrically connected with the battery 43 of the hot-swapping uninterruptible power supply module 40, the voltage step-down conversion module 423, and the voltage step-up conversion module 424. The monitoring circuit 422 has another end electrically connected with the control module 41. The 5V standby module 421 has an end electrically connected with the control module 41 of the hot-swapping uninterruptible power supply module 40, the voltage step-down conversion module 423, and the voltage step-up conversion module 424. The 5V standby module 421 has another end electrically connected with the voltage step-down conversion module 423, the voltage step-up conversion module 424, the first power supply device 10, and the electronic system 30. The voltage step-down conversion module 423 comprises a voltage step-down circuit and an interleaved voltage step-down circuit, as shown in FIGS. 7 and 8. Further, FIG. 9 illustrates a circuit diagram of the monitoring circuit 422.

Figure 2:
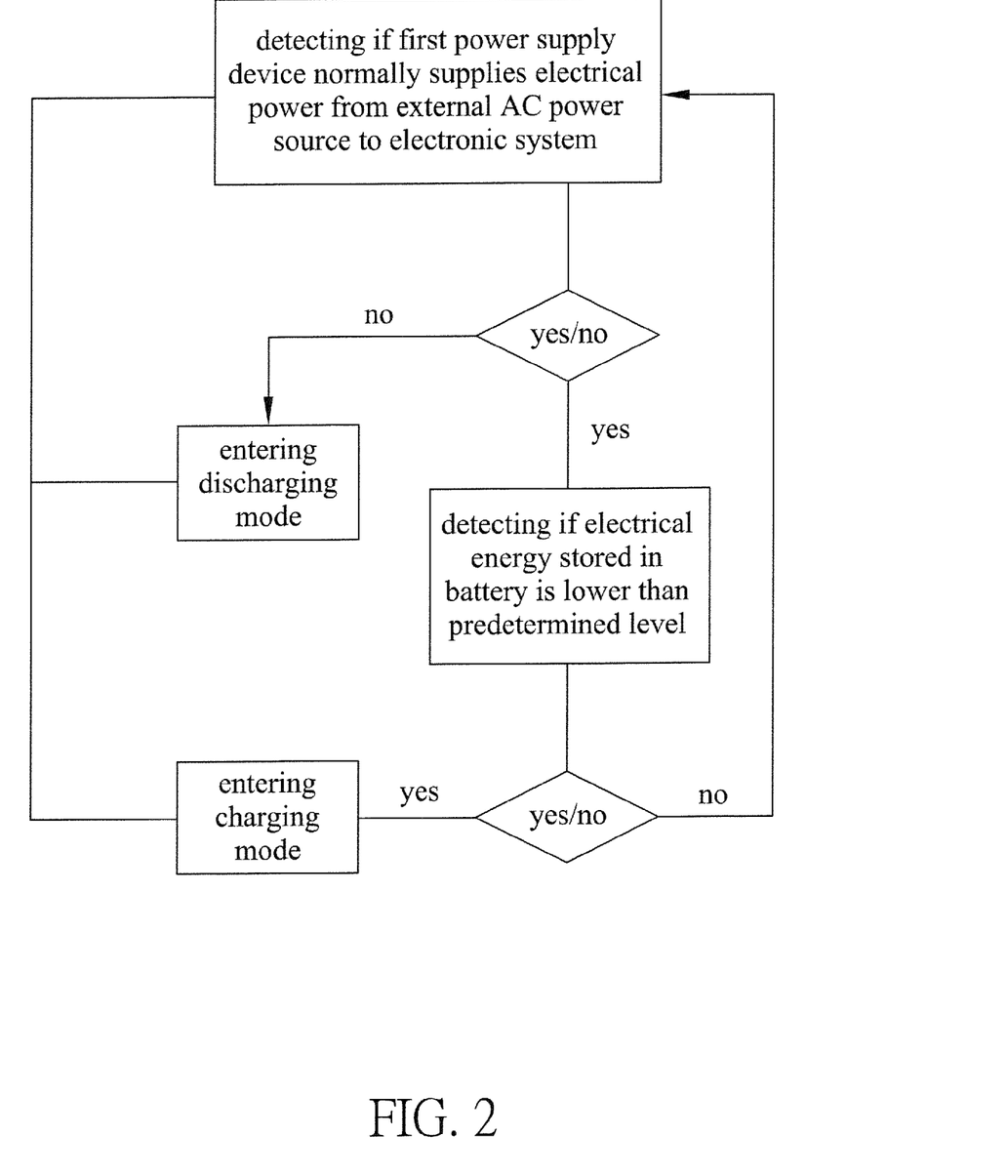
FIG. 2 is a flow chart illustrating an operation of the present invention.
Figure 3:
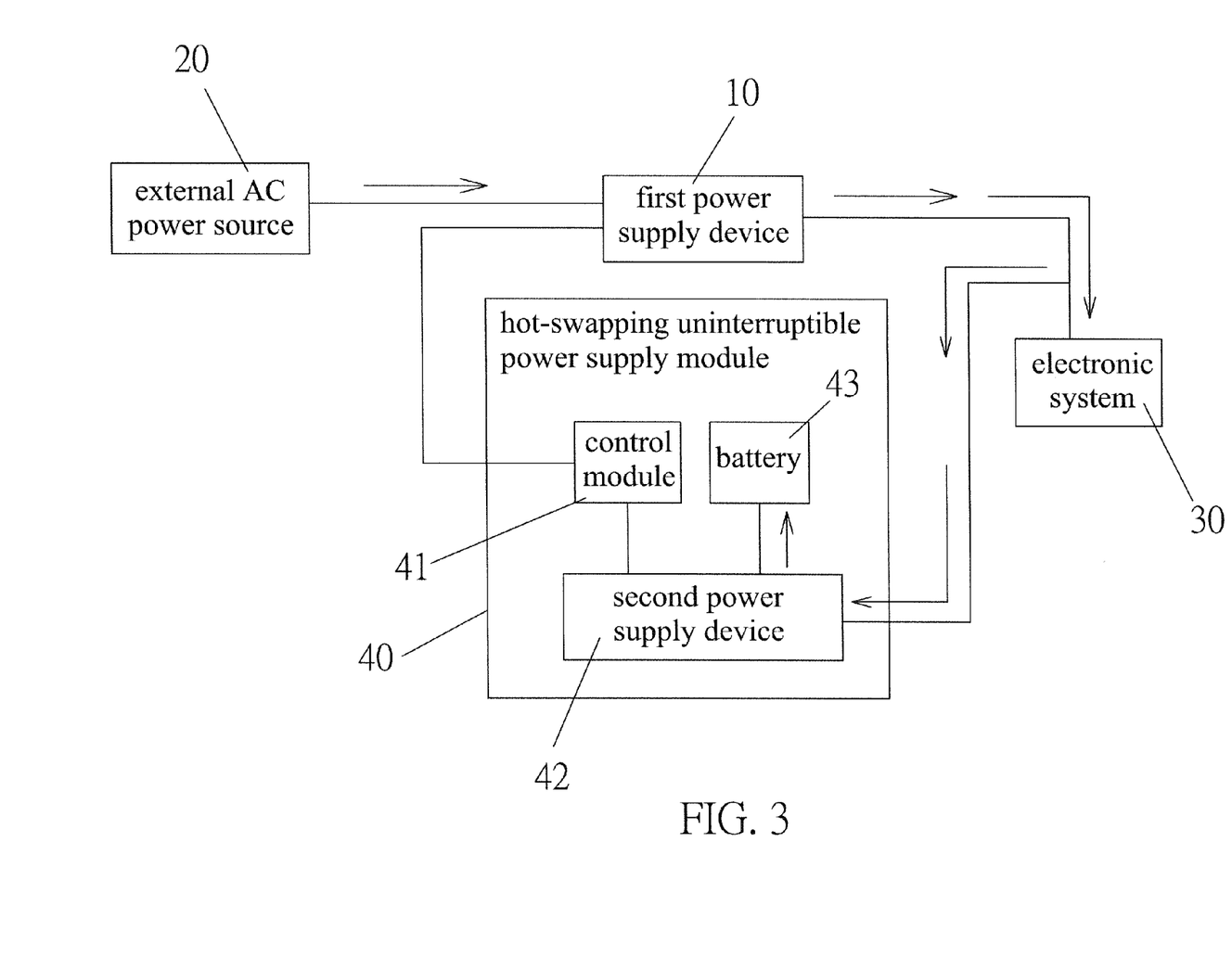
FIG. 3 is a schematic view illustrating a charging mode of a hot-pluggable uninterruptible power supply module according to the present invention.
Figure 4:
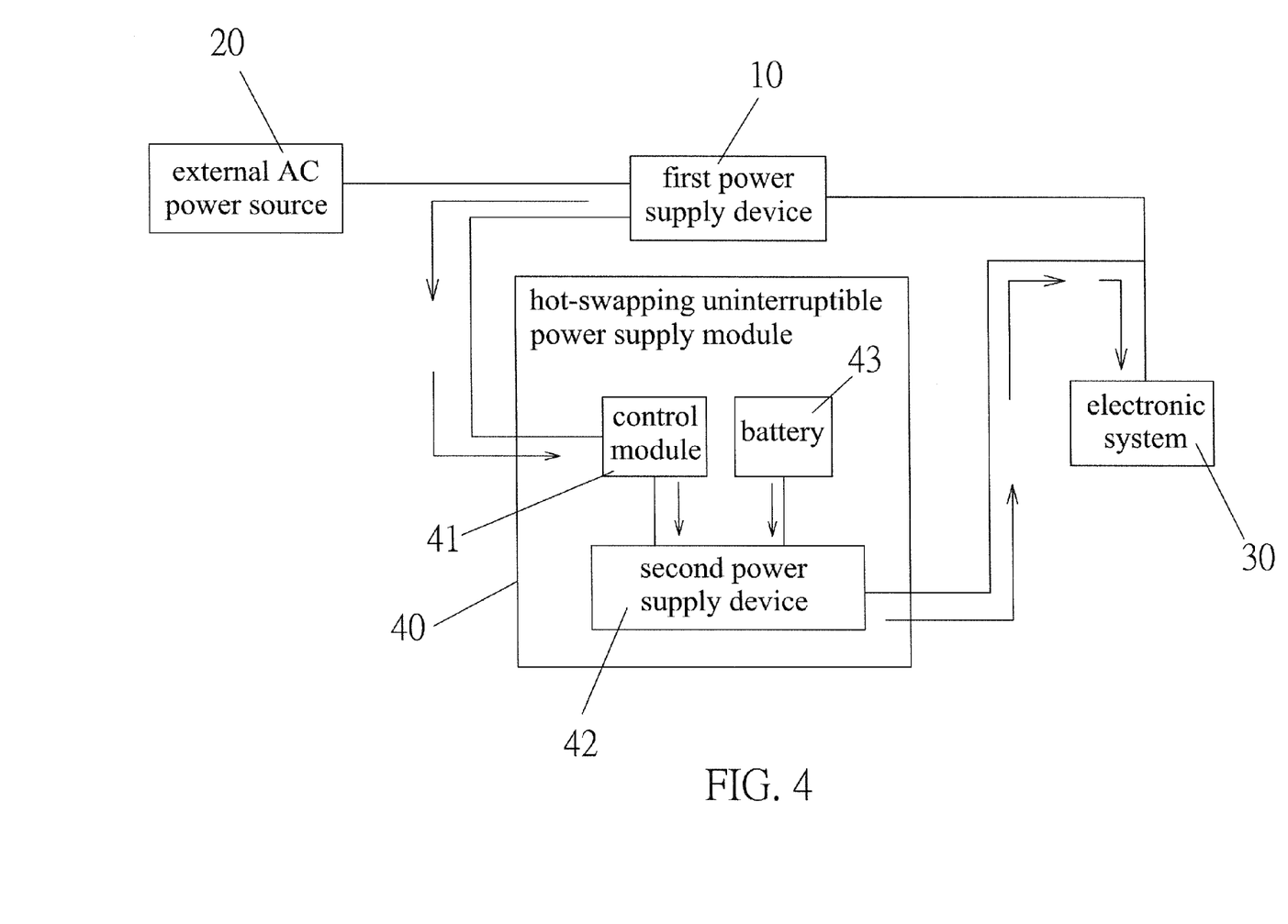
FIG. 4 is a schematic view illustrating a discharging mode of the hot-pluggable uninterruptible power supply module according to the present invention.

Referring to FIGS. 2 and 3, the present invention is arranged such that the second power supply device 42 comprises the control module 41 and the control module 41 timely detects, via the monitoring circuit 422, a switching signal indicating the electronic system 30 is connected, whereby when the electronic system 30 is deactivated, the hot-swapping uninterruptible power supply module 40 is set off with all the operations of output, charging, or discharging being suspended and when the electronic system 30 is activated, the hot-swapping uninterruptible power supply module 40 first enters a standby mode via the 5V standby module 421 and then determines if to enter a charging mode or a discharging mode or to maintain the standby mode. At the same time, the control module 41 also detect if the first power supply device 10 is normally supplying electrical power from the external AC power source 20 to the electronic system 30, whereby when the electrical power is normally supplied, in addition to the first power supply device 10 normally supplying the electrical power to the electronic system 30, if the hot-swapping uninterruptible power supply module 40 is not discharging electricity and the energy stored therein is lower than a predetermined level or a threshold, such as 85%, then the first power supply device 10 provides charging electricity that is charged, via the second power supply device 42 of the hot-swapping uninterruptible power supply module 40, back to the battery 43 so that the control module 41 of the hot-swapping uninterruptible power supply module 40 may determine to enter the charging mode. Further, referring to FIGS. 2 and 4, in an event of an abnormal condition and all the first power supply devices 10 receiving no AC power from the external AC power source 20, the first power supply devices 10 issues a communication signal to the control module 41n and the control module 41 signals the battery 43 to supply electrical power, via the 5V standby module 421 and the voltage step-down conversion module 423, to the electronic system 30 to achieve an effect of ensuring non-interrupted power supply to the electronic system 30.

Further, referring to FIGS. 5 and 8, the present invention is arranged such that the second power supply device 42 comprises the voltage step-up conversion module 424 and when the control module 41 identifies a DC voltage supplied from the first power supply device 10 is higher than a threshold, such as 11.4V, the voltage step-up conversion module 424 raises the supply voltage of the first power supply device 10 to achieve an effect of charging the battery 43 and meanwhile, the monitoring circuit 422 continuously monitors the charging condition of the battery 43, this being the charging mode; and when the battery 43 is full of electrical power or reaches a threshold of energy storage, the monitoring circuit 422 signals the control module 41 to temporarily stop charging.

Referring to FIGS. 5, 7, and 8, the present invention is arranged such that the second power supply device 42 comprises the voltage step-down conversion module 423 and the control module 41 uses the voltage step-down conversion module 423 to convert the energy stored in the battery 43 into a DC voltage so that the DC voltage can supply electrical power to the electronic system 30, this being a discharging mode; and when the energy stored in the battery 43 is used up or any one of the first power supply devices 10 resumes its receipt of electrical power from the external AC power source 20 for normally supplying electrical power to the electronic system 30, the discharging mode is temporarily suspended and the first power supply device 10 is continuously monitored for occurrence of any abnormal condition, when electrical discharging will be resumed.

Further, referring to FIG. 1 again, the present invention is arranged to comprise the control module 41, the at least one hot-swapping uninterruptible power supply module 40, and the at least one first power supply device 10 with each of the hot-swapping uninterruptible power supply modules 40 being electrically connected with each other in parallel and each of the first power supply devices 10 being electrically connected with in parallel, so that when an external AC power source 20 is removed from all the first power supply devices 10, a function of supplying electricity to the electronic system 30 can be achieved with all the hot-swapping uninterruptible power supply modules 40; with all the hot-swapping uninterruptible power supply modules 40 being electrically connected in parallel, a function of dividing an electrical current among all the hot-swapping uninterruptible power supply modules 40 can be achieved and a function of uniformly distributing the output can be achieved; and further with the hot-swapping uninterruptible power supply module 40 being composed of how swapping circuitry, when a user unplug and separate one of the first power supply devices 10 from the external AC power source 20, the one of the hot-swapping uninterruptible power supply modules 40 immediately supplies electrical power, in a normal manner, to the electronic system 30 to form a hot-pluggable uninterruptible power supply system. Further, for the purpose of activating the battery 43 contained in the hot-swapping uninterruptible power supply module 40, the control module 41 is arranged such as to provide the hot-swapping uninterruptible power supply module 40 with a function of periodic electrical discharging; and the control module 41 may be manually operated or automatically operates to set a time schedule for discharging of the battery 43. Further, through proper voltage adjustment, the voltage level of the electrical discharging of the battery 43 of the hot-swapping uninterruptible power supply module 40 is set at the same level as the voltage supplied from the first power supply device 10. When the battery 43 is discharged to a predetermined threshold, the discharging operation is temporarily suspended and the first power supply device 10 is caused to resume a normal operation of supplying electrical power.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A hot-pluggable uninterruptible power supply module, comprising:
    at least one first power supply device, wherein each of the first power supply devices has an end electrically connected with an electronic system and each of the first power supply devices has another end electrically connected with an external AC power source, whereby each of the first power supply devices converts an alternate-current voltage into a direct-current voltage to achieve a function of supplying electrical power to the electronic system; and
    at least one hot-swapping uninterruptible power supply module, wherein each of the hot-swapping uninterruptible power supply modules comprises a control module, a second power supply device, and a battery, the battery being electrically connected with the second power supply device, the second power supply device being electrically connected with the control module, the control module of each of the hot-swapping uninterruptible power supply modules being electrically connected with each of the first power supply device, the second power supply device of each of the hot-swapping uninterruptible power supply module being electrically connected with the electronic system and an end of each of the first power supply device;
    wherein the second power supply device comprises a 5V standby module, a monitoring circuit, a voltage step-down conversion module, and a voltage step-up conversion module, the voltage step-up conversion module being electrically connected with the battery of the hot-swapping uninterruptible power supply module, the voltage step-down circuit being electrically connected with the battery of the hot-swapping uninterruptible power supply module, an end of the monitoring circuit being electrically connected with the battery, the voltage step-down conversion module, and the voltage step-up conversion module of the hot-swapping uninterruptible power supply module, another end of the monitoring circuit being electrically connected with the control module, an end of the 5V standby module being electrically connected with the control module, the voltage step-down conversion module, and the voltage step-up conversion module of the hot-swapping uninterruptible power supply module, another end of the 5V standby module being electrically connected with the voltage step-down conversion module, the voltage step-up conversion module, the first power supply device, and the electronic system.

2. The hot-pluggable uninterruptible power supply module according to claim 1, wherein each of the first power supply devices is electrically connected with each other in parallel.

3. The hot-pluggable uninterruptible power supply module according to claim 1, wherein each of the hot-swapping uninterruptible power supply modules is electrically connected with each other in parallel.

4. The hot-pluggable uninterruptible power supply module according to claim 1, wherein the voltage step-down conversion module comprise a voltage step-down circuit and an interleaved voltage step-down circuit.

5. The hot-pluggable uninterruptible power supply module according to claim 1, wherein the battery comprises a rechargeable battery.

6. The hot-pluggable uninterruptible power supply module according to claim 1, wherein each of the first power supply devices is electrically connected with each other in parallel.

7. The hot-pluggable uninterruptible power supply module according to claim 1, wherein each of the hot-swapping uninterruptible power supply modules is electrically connected with each other in parallel.

8. The hot-pluggable uninterruptible power supply module according to claim 1, wherein the battery comprises a rechargeable battery.

* * * * *